United States Patent

Dull

[15] 3,697,816

[45] Oct. 10, 1972

[54] ELECTRIC NETWORK AND METHOD OF MAKING SAME

[72] Inventor: Helmut Dull, Westerland/Sylt, Germany

[73] Assignee: Bernhard Beyschlag Apparatebau GmbH, Westerland/Sylt, Germany

[22] Filed: July 6, 1970

[21] Appl. No.: 52,356

[30] Foreign Application Priority Data

July 5, 1969 Germany..........P 19 34 238.2

[52] U.S. Cl..........317/101 CC, 317/101 CW, 29/624

[51] Int. Cl.................................................H05k 1/04

[58] Field of Search........29/610, 619, 621, 624, 628, 29/630 G; 317/101 CC, 101 A, 101 CW, 101 CP; 338/203, 319

[56] References Cited

UNITED STATES PATENTS

| | | | |
|---|---|---|---|
| 3,225,260 | 12/1965 | Brochier | 317/100 CW |
| 2,613,252 | 10/1952 | Heibel | 317/101 CC |
| 3,216,089 | 11/1965 | Dettman | 317/101 CC |
| 3,284,671 | 11/1966 | Baker et al. | 317/101 CW |
| 3,302,066 | 1/1967 | Riemann | 317/101 CW |
| 3,193,611 | 7/1965 | Huetten | 317/101 CW |

*Primary Examiner*—David Smith, Jr.
*Attorney*—Spencer & Kaye

[57] ABSTRACT

An electrical network has a carrier-free, self-supporting grid system prefabricated in one piece of an electrically conductive material. The grid system defines a plurality of electrically conductive paths. A predetermined number of various electrical components are mounted on the grid system in predetermined locations, and predetermined ones of the defined conductive paths are severed. The self-supporting grid system may be constructed as a continuous tape and cut to the desired size; and the predetermined paths may be severed by stamping or cutting.

18 Claims, 7 Drawing Figures

Inventor:
Helmut Düll
BY Spencer & Kaye
ATTORNEYS.

Inventor:
Helmut Düll
BY Spencer & Kaye
ATTORNEYS.

INVENTOR

Helmut Düll

BY Spencer & Kaye

ATTORNEYS.

ELECTRIC NETWORK AND METHOD OF MAKING SAME

BACKGROUND OF THE INVENTION

The present invention relates to networks of a plurality of electrical components and prefabricated, carrier-free, self-supporting electrically conductive grid systems which are selectively connectible in a substantially completely arbitrary fashion.

It is known to simplify the manufacture of electrical networks or subassemblies by fabricating the connections between the individual components and the adjacent units by so-called printed circuits. In this case, metallic conductive paths may be applied by a suitable method to an insulating material which meets the particular requirements and serves as a base plate. In addition, a metal foil laminated to an insulating material may be removed to such an extent that all that remains are the desired conductors in their predetermined configuration. The components are then inserted into the circuit board and are connected with the conductors by, for example, dipping them in a solder bath.

These printed circuit methods offer substantial advantages as compared to the previously employed "-wiring" method with its individual soldering points, in that a saving in both time and qualified personnel for the manufacture, testing and repair of groups of components or networks is realized. Printed circuits, however, also have considerable disadvantages which make improvement desirable.

The material cost, for example, becomes high when exacting requirements for insulation or phase angles in the base plate are encountered. Moreover, relatively inexpensive manufacture of such circuits is possible only when large numbers of each item are being produced. The printing patterns must be changed if modifications are required in a series, which is connected with a loss of time.

Another type of known printed electric network includes the so-called thick-film and thin-film circuits. In this case, the connecting lines and all or part of the components are applied, inter alia, through masks by the known printing or vapor-deposition technique to base plates of, for example, a high-quality ceramic material.

This method is also relatively expensive, since the production of masks requires utmost precision and the failure or malfunction of a single component in the circuit results in failure of the entire circuit. Modifications can be made only by preparing new masks. Moreover, pretesting of individual elements is usually not possible, so that it is only at high technical expense that the failure behavior of such circuits becomes comparable with the behavior of circuits of discrete components. The frequently encountered requirement of adapting a certain circuit to individually differing surroundings, perhaps even with different requirements for dependability, in a technically and economically optimum manner, can be met substantially better with discrete components such as carbon and metal film resistors.

SUMMARY OF THE INVENTION

It is an object of the present invention to provide an apparatus and method of making the same that overcomes the disadvantages referred to above.

This object and others are accomplished according to the present invention by providing networks having prefabricated, carrier-free, self-supporting grid systems which serve as the connecting lines. A simple cutting or stamping process is preferably used after the circuit is provided with its components to separate or remove all the undesired connections. The grid system of the present invention can be manufactured very inexpensively in a form of a practically endless tape, and can be cut into any desired length adapted to the size of the network. This cutting is preferably done after the components have been applied and/or fastened to the tape. The components may be fastened to the tape by any suitable, known method, such as soldering or welding.

DESCRIPTION OF THE PREFERRED EMBODIMENTS

Figure 1:
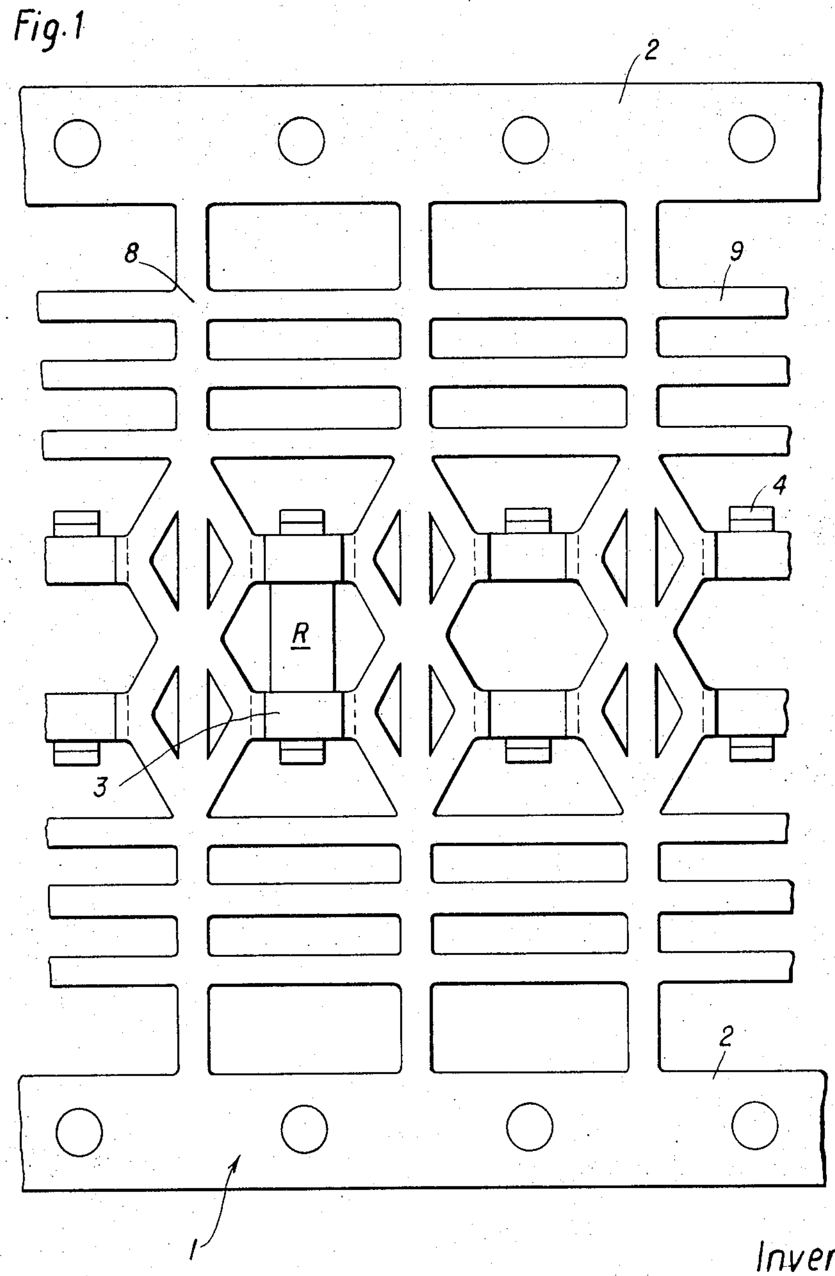
FIG. 1 is a bottom plan view of a portion of a grid system tape according to the present invention.

FIG. 1 shows a plan view of a perforated tape 1 which may be used to form a self-supporting grid system according to the present invention. It may be fabricated of tin-plated copper or any other suitable, well-known solderable and/or weldable metal or metal alloy which may be metallized by being coated with a thin metallic layer. Since the tape 1 is not to be secured to a base plate, its thickness is not a function of its adhesion to the base plate material and is determined only by its mechanical stability and the desired soldering speed. It will normally be less than 1 mm.

The perforated strips 2 on each side of tape 1 in FIG. 1 permit defined advancement of the tape, as by a sprocket (not shown), and facilitate placement of the components and removal of unused conductive paths. These strips are not absolutely necessary, and are removed when the network is completed. The remaining network provides selective connections for all of the network components with one another and with the outside environment.

Figure 2:
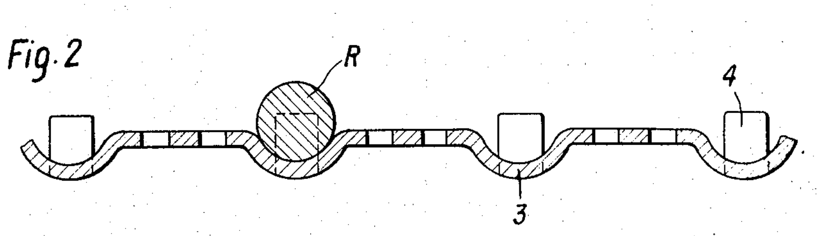
FIG. 2 is a cross-sectional view of the tape of FIG. 1.

As can be seen from FIGS. 1 and 2, the tape 1 has a plurality of openings defining nodes 8 and links 9 for transmitting electrical current about the grid, and receptacles 3 for retaining various types of electrical components. The receptacles 3 shown in FIGS. 1 and 2 have a semicircular shape and serve to hold components having circular cross sections. These components can be resiliently secured in a known manner, either by the suitable configuration of the receptacles 3 or by the provision of limiting flanges 4 (FIG. 2), or both, for lateral guidance of the components. FIGS. 1 and 2 show a resistor R which is pressed into a receptacle 3 with a slight pressure. The receptacles can also be formed to receive components having different cross-sectional configurations than circular, as well as to accept wires.

Figure 3:
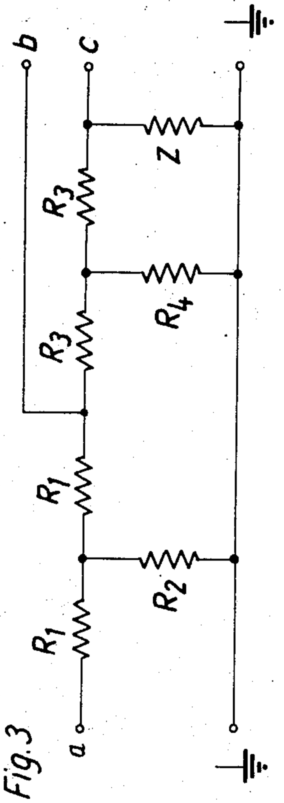
FIG. 3 is a schematic diagram of a double-T network with a center tap.
Figure 4:
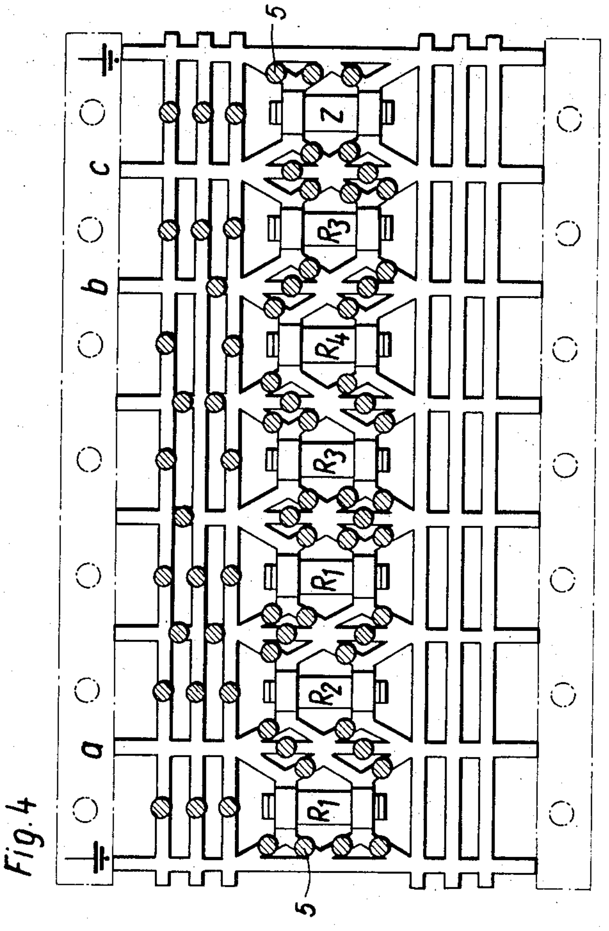
FIG. 4 is a bottom plan view of a tape according to the present invention with components and severed links arranged to realize the circuit of FIG. 3.

After a predetermined number of electrical components are placed on the tape, they are soldered together, as for example, by immersion in liquid tin, and are then cleaned. It is possible to weld the components to the tape 1 in a known manner, as well as fastening them by soldering. Then, in accordance with the desired circuitry to be produced, a simple, programmable stamping process in which a stamp is associated with each conductive path to remove or sever the undesired link portions is performed in such a way that only the desired conductive paths remain. This is shown, for example, with the fabrication of a double-T network with center tap as shown schematically in FIG. 3 and as hardware in FIG. 4. The link portions of the tape 1 to be stamped out are shown in FIG. 4 by circles 5, which are hatched in order to point them out more clearly. Thus, by providing a selectively actuatable stamping device, such as a plunger, at a point between each node in the grid, the selected components can be connected together in any desired manner.

After the undesired connections have been severed, the network is covered with a suitable insulating protective layer, such as a suitable lacquer, in such a manner that the terminals are protected from being covered. The covering protects the tape and components against external influences such as climate, temperature and mechanical stresses.

Before the network is covered with protective medium, the perforated strips 2 on each side of tape 1 in FIG. 1 are cut off. Then the terminals are clamped, for example, in elastic strips of synthetic rubber and, thus, are kept from being covered with protective medium.

Further processing of the networks thus produced can be accomplished in practically all configurations presently employed. The network can, for example, be enclosed, or encased, by extruded sheathing, or can be cast or built into a housing along with plug-in connections such as electrical connectors. Any suitable, known material may be used for this. It can also be combined with other networks and components in its tin-plated or covered state to form an assembly.

Figure 6:
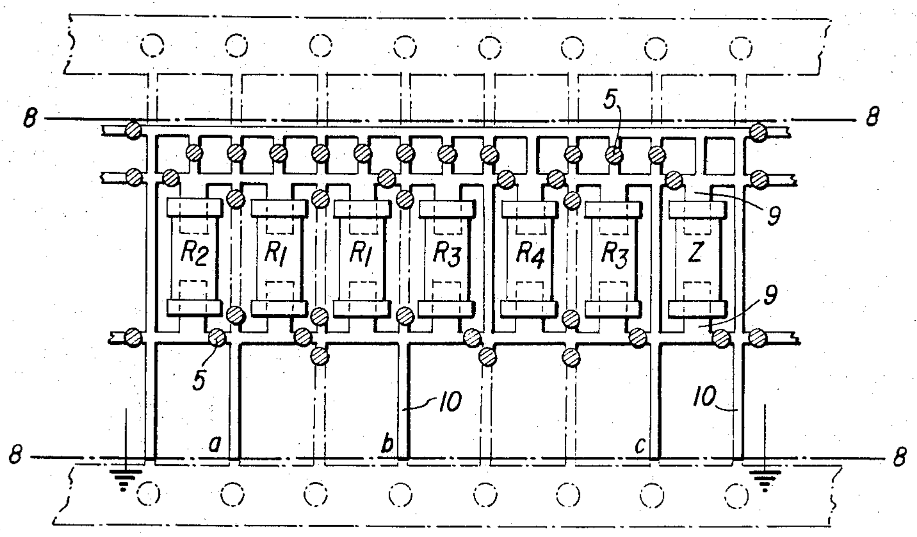
FIG. 6 is a bottom plan view of a simplified form of a perforated plain tape according to the present invention which is arranged to realize the circuit of FIG. 3 with only three horizontal cross sections and with the components welded onto the tape.

FIG. 6 shows a simplified form of a perforated plain tape 1 having only three horizontal cross connections and with components welded onto the tape. The arrangement of the components and of conductive or stamped out current paths is in conformity with the configuration of FIG. 3.

The Components are positioned and pressed onto the strips 9 by means of an insulating device in the course of welding. The terminals 10 are the connectors for soldering the network into a printed wiring board or into another type of electrical equipment. The undesired connections in the perforated tape are stamped out, see circles 5.

Before protecting the components and the internal connections, the perforated side-strips 2 shall be cut off along the lines 8 shown in FIG. 6.

Figure 7:
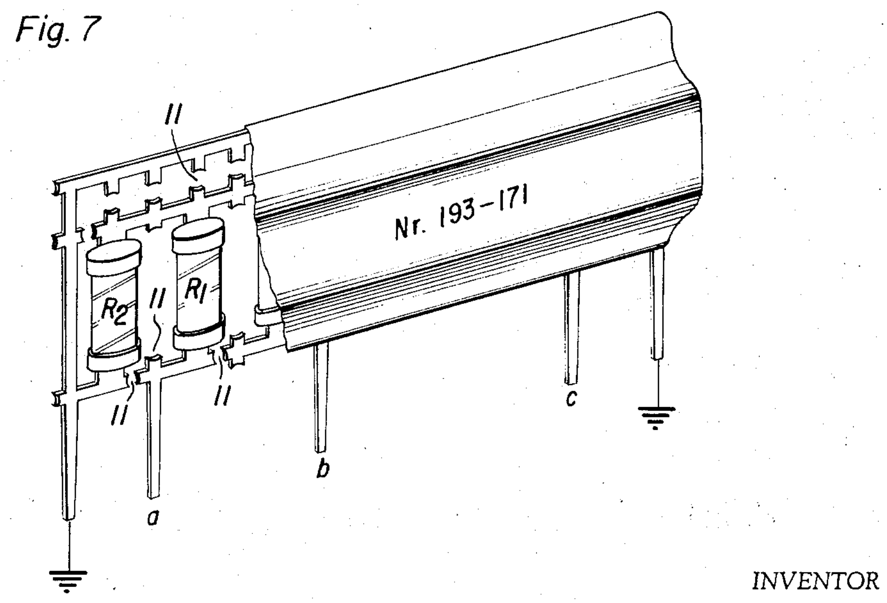
FIG. 7 is a perspective view, partly schematic and partly cut-away, of a network constructed in accordance with the arrangement of FIG. 6.

FIG. 7 shows an accomplished network in accordance with FIG. 6 with its protection partly removed.

The network is provided with terminals *a*, *b*, and *c*, a pair of flanking ground terminals, and has a stamped out current path 11. The stamped out portions correspond to the circles 5 in FIG. 6.

A particular advantage of the above-described network is that it also permits the use of components without lead wires, and this results in particularly small dimensions for the finished network. With the multitude of possible ways of providing connections, it is possible to select a path of connection that does not require many loops and, thus, to keep the crosstalk to adjacent circuits sufficiently small.

Figure 5:
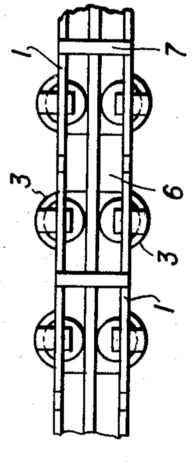
FIG. 5 is a side elevation view of a portion of a network according to the present invention having the grid system arranged in two layers.

With the use of proper spacing in the form of conductive connections, insulating bars, foils, components and plates it is also possible to provide a multiple-layer structure of networks by means of the grid systems of the present invention. An example of such a multiple-layer structure is shown in FIG. 5, which has, for example, two layers. The two networks are here held at the proper spacing by insulating spacers 6 and common connectors 7. It is also possible to have the components contacted by both of the grid systems adjacent to it in a multiple-layer structure so as to bring the connections into two planes. It is then possible to perform line crossovers which are not possible in one plane and, thus, construct complicated networks.

It is also possible to use the networks according to the present invention for the assembling of transistor circuits or small switching units consisting of active and/or passive components. This is particularly desirable since these types of components must often be used together. It is then advisable to provide suitable recesses in the grid system at periodic intervals. If these recesses are not required, they can be cut out of the grid system with a negligible amount of lost material.

It will be understood that the above description of the present invention is susceptible to various modifications, changes and adaptations and the same are intended to be comprehended within the meaning and range of equivalents of the appended claims.

I claim:

1. A mounting strip for electrical components comprising:

a. a plurality of pairs of electrical component receptacles assembled in a row;

b. at least two elongated strips each extending along a respective side of said row; and c. connecting means interposed between said pairs of receptacles and connected between said strips and to said receptacles for defining a plurality of conductive paths by which each said receptacle is connected to one said strip by a respective conductive path which is severable from every other receptacle.

2. A mounting strip as defined in claim 1, wherein said connecting means forms with said pairs of receptacles and said elongated strips a planar closed continuous structurally connected unitary grid system which is carrier-free and self-supporting and which defines a plurality of internal and external electrically conductive paths.

3. A mounting strip as defined in claim 1, wherein each receptacle is connected by said connecting means to the strips on at least one of said sides by two conductive paths, so that each said receptacle is severable from every other receptacle.

4. A mounting strip as defined in claim 1, wherein said connecting means includes a plurality of pairs of diamond shaped conducting strips aligned in a transverse direction to said elongated strips on both sides of said row.

5. A mounting strip as defined in claim 1, wherein said connecting means includes a single conducting strip between each adjacent pair of receptacles which is connected to said receptacles through said elongated strips.

6. An electrical network, comprising, in combination: the grid system of claim 2 wherein predetermined ones of the electrically conductive paths are severed; and at least one electrical component mounted on said grid system in a predetermined location by means of two of the receptacles said network being at least in part held together by said at least one component.

7. An electrical network as defined in claim 6 wherein the material of said electrically conductive grid system is a metallized metal.

8. An electrical network as defined in claim 7 wherein said metallized metal is a tin-plated metal.

9. The electrical network as defined in claim 7 wherein the receptacles are so preshaped that said at least one component is held therein in a resilient manner.

10. An electrical network as defined in claim 9 wherein said at least one component is mounted on said grid system by a solder connection.

11. An electrical network as defined in claim 6 wherein said at least one component is connected to the grid system by a welded connection.

12. An electrical network as defined in claim 6 wherein said at least one component has a body portion adapted to be attached directly to said grid system.

13. An electrical network as defined in claim 6, further including an insulating protective covering for said at least one component and the grid system to protect them against external influences such as climate, temperature and mechanical stresses.

14. An electrical network as defined in claim 13 wherein there are a plurality of grid systems each disposed in a different plane from the others, and further including conductive connections, insulated foils, bars and other components to hold the plurality of grid systems at a predetermined spacing from one another.

15. An electrical network as defined in claim 14 wherein there are a plurality of components arranged in more than one plane.

16. An electrical network as defined in claim 15, further including plug-in connections, and wherein said connections, said grid system and said at least one component are encased in a protective material.

17. An electrical network as defined in claim 6 wherein said grid system contains recesses for mounting active and passive components in the form of integrated circuits and other active multiple-pole components.

18. A mounting strip as defined in claim 1, wherein three elongated strips are provided on each side of said row.

* * * * *